United States Patent [19]
Chan

[11] Patent Number: 5,967,643
[45] Date of Patent: Oct. 19, 1999

[54] RETRACTABLE LIGHTED MAGNIFIER AND FLASHLIGHT

[75] Inventor: Wai Hong Chan, Tin Shui Wai, The Hong Kong Special Administrative Region of the People's Republic of China

[73] Assignee: Sunrich Manufactory Ltd., Tuen Mun, The Hong Kong Special Administrative Region of the People's Republic of China

[21] Appl. No.: 09/265,209

[22] Filed: Mar. 10, 1999

[51] Int. Cl.[6] ........................................................ F21L 5/00
[52] U.S. Cl. ........................... 362/208; 362/287; 359/802
[58] Field of Search ..................................... 362/188, 208, 362/269, 282, 287; 359/799, 800, 802, 803, 808, 809, 810, 817

[56] References Cited

U.S. PATENT DOCUMENTS 1,884,968  10/1932  Bloch ...................................... 359/803
2,713,807  7/1955  Herbert ................................... 359/808
5,642,234  6/1997  Altman et al. .......................... 359/802

*Primary Examiner*—Y. Quach
*Attorney, Agent, or Firm*—Nims, Howes, Collison Hansen & Lackert

[57] ABSTRACT

A combined illuminating magnifier and flashlight has a housing with a pivot, a frame for carrying a magnifying lens mounted to the housing and being rotatable about the pivot between a retracted position, where the magnifying lens is located in the housing and an extended position where the magnifying lens is available for use. A light is mounted in the frame for illuminating the magnifying lens. The light, when the frame is retracted, is aligned with a flashlight lens such that the device can function as either an illuminating magnifier or as a flashlight.

10 Claims, 3 Drawing Sheets

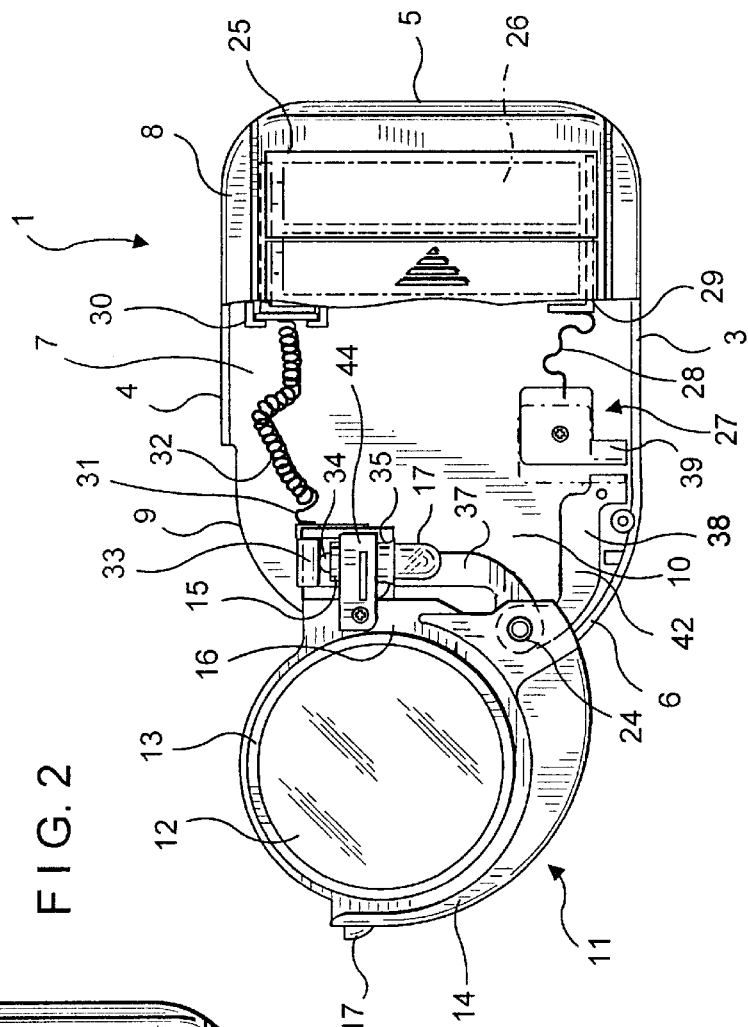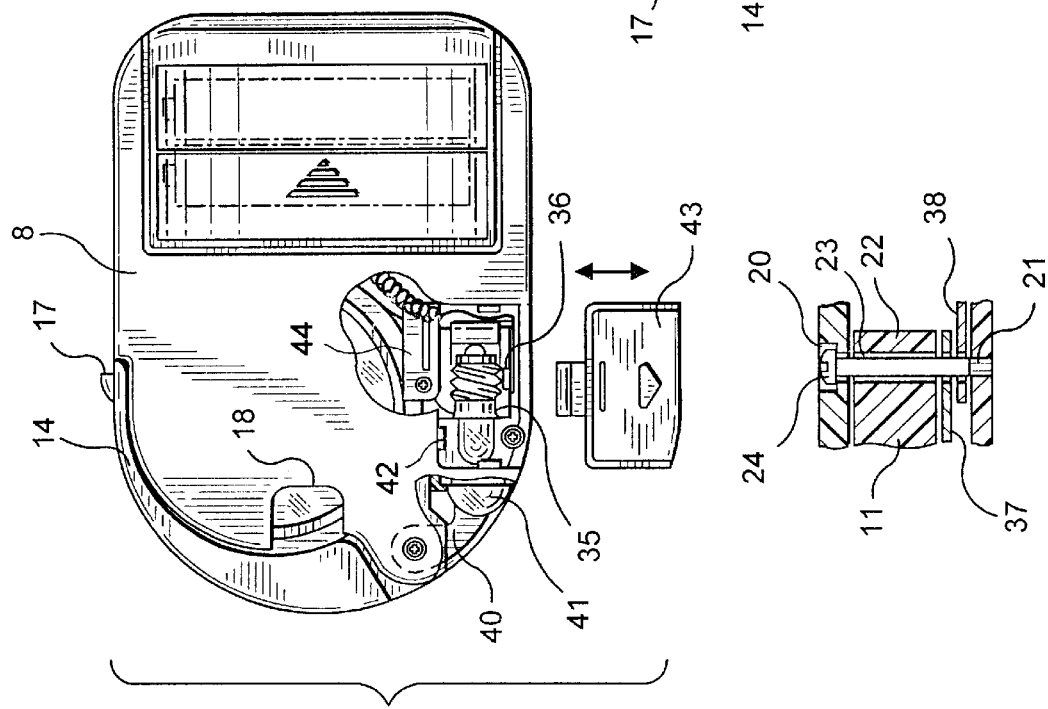

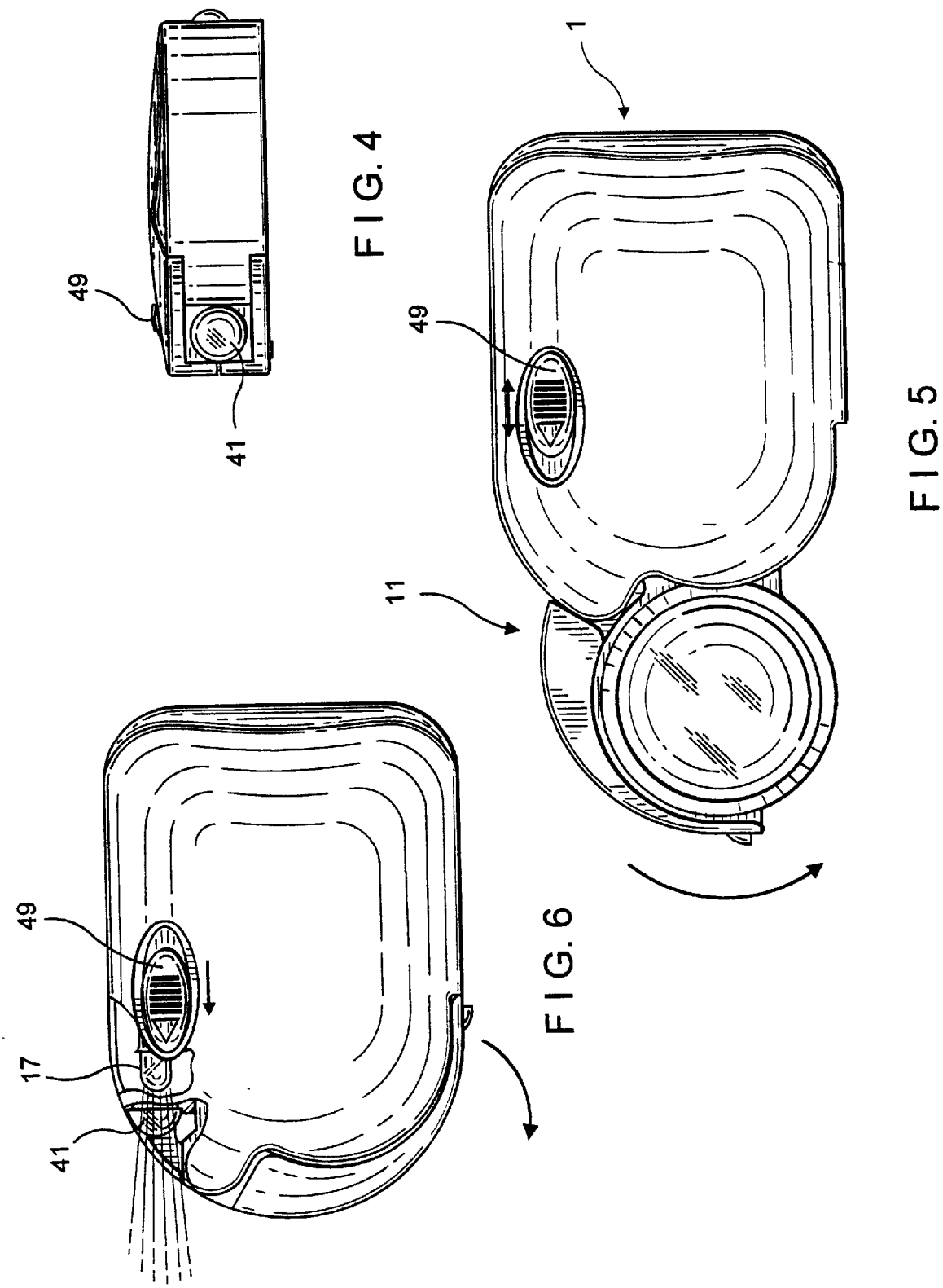

RETRACTABLE LIGHTED MAGNIFIER AND FLASHLIGHT

TECHNICAL FIELD

This invention relates to a viewing magnifier and more particularly to an illuminated magnifier and combined flashlight.

BACKGROUND

A retractable illuminating magnifier which provides compactness and ease in operation is described in U.S. Pat. No. 5,754,349. That device utilizes, among other features, a conductive spring to simplify construction.

In U.S. Pat. Nos. 2,297,232 and 1,900,930, circular magnifying devices are shown which are extendable, but these have no illumination.

In U.S. Pat. No. 1,884,968, a combined flashlight with reading glass is shown.

These devices all have various shortcomings. In particular, it has been difficult to achieve a multifunctional device which still minimizes size, is easy to use yet provides not only magnification or illuminated magnification but can function as an effective flashlight.

SUMMARY OF THE INVENTION

It is an object of the present invention to provide a multifunctional device that includes an illuminating magnifier and a flashlight, in compact size and of simple construction.

It is another object to provide a combined retractable illuminated magnifier and flashlight that has a housing that acts as a protective case for the magnifying lens when the device is used as a flashlight.

These and other objects of the present invention are achieved by a combined retractable illuminated magnifier and flashlight comprising a housing, a frame pivotally mounted to the housing, the frame being rotatable between a retracted position and an extended position, a magnifying lens mounted in the frame, a light mounted on the frame and movable therewith, an electric circuit for supplying electric current to the light and, a flashlight lens, mounted in a distal end of the housing, the lens located adjacent a frame receiving receptacle, the light located in the frame such that when the frame is in the retracted position, the light is aligned in the frame receiving receptacle with the flashlight lens.

Utilizing the applicant's invention, a frame mounted light can not only illuminate magnified images, but can also function as a conventional flashlight when the magnifying lens is in the protective housing. The simplicity of the invention minimizes size, as well as cost, while adding a valuable flashlight feature.

BRIEF DESCRIPTION OF THE DRAWINGS

FIG. 1 is a partial cross-sectional view of a retractable illuminated magnifier in accordance with the present invention, the magnifier in the extended position.

FIG. 2 is a partial cross-sectional view of the retractable illuminated magnifier with the magnifier shown in the retracted position.

FIG. 3 is an enlarged cross sectional view of the pivot assembly.

FIG. 4 is a front view of the combined illuminating magnifier, showing the flashlight lens.

FIG. 5 is a view of the combined illuminating magnifier with the magnifier in the extended position.

FIG. 6 is a view of the combined illuminating magnifier with the magnifier in the retracted position.

DETAILED DESCRIPTION OF THE INVENTION

Figure 7:
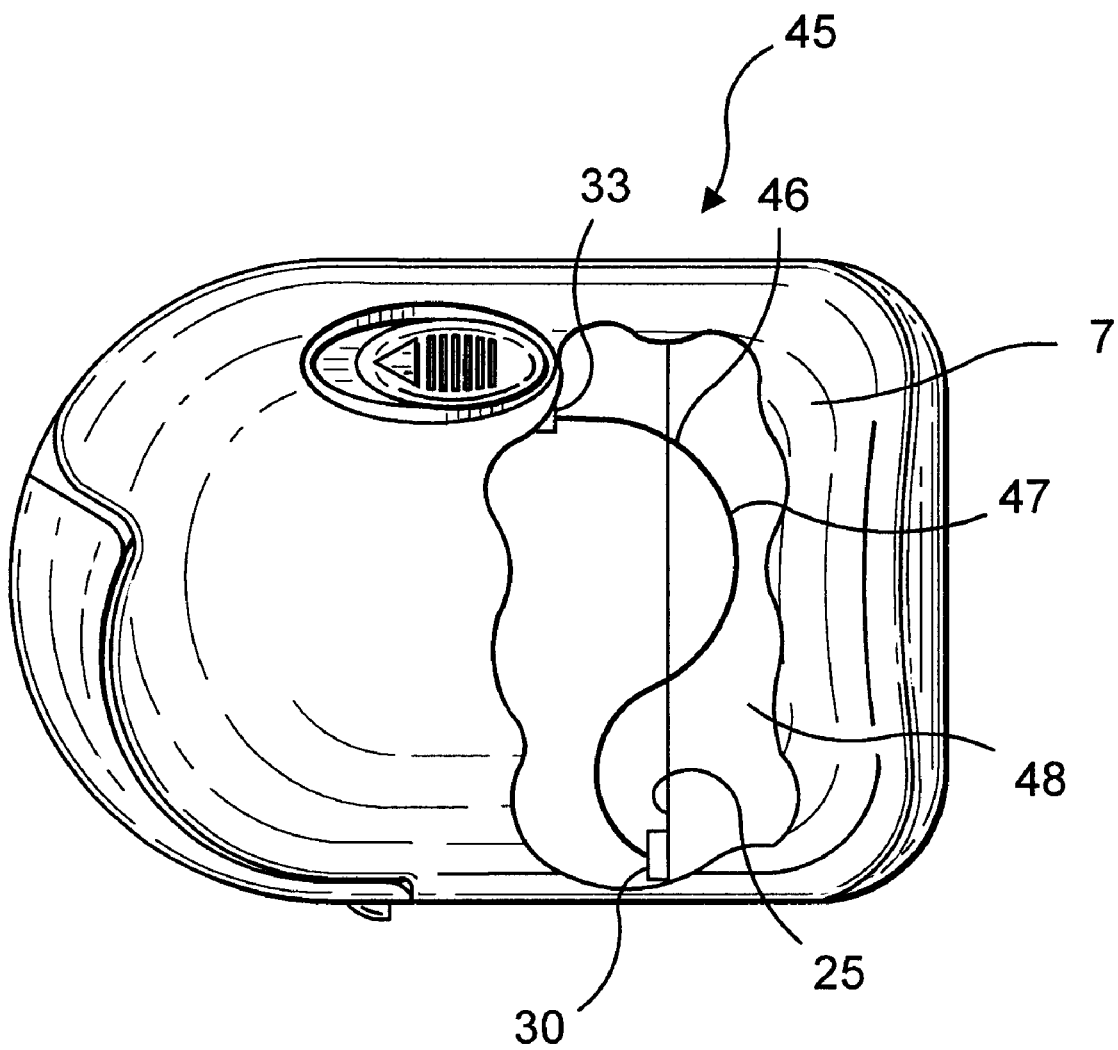
FIG. 7 is a view showing an alternative embodiment of the invention.

Referring to FIGS. 1 and 2, a combined illuminating magnifier and flashlight 1 has an enclosure 2 defined by a pair of sidewalls 3 and 4, a back wall 5, a front wall 6, a top wall 7 and a bottom wall 8. An opening 9 leads into a frame receiving chamber 10.

A frame 11 contains a magnifying lens 12 therein, surrounded by a lens receiving wall 13. The frame has a covering wall 14 which mates to the lens receiving wall 13, the covering wall sized to fit over the opening 9. The magnifying lens may be of conventional construction, having a magnification factor of about 2× to 10×, with about 6× preferred.

The frame also has a light receiving socket 15 adjacent a light passage 16 that leads through the lens receiving wall 13 to the lens 12. A bulb 17 is fitted to the socket to illuminate the lens 12. The bulb may be of conventional construction, one example being a bulb of 2.2 V 0.25 A, though other bulbs can be used. Further, the bottom wall 8 has a window 18 located adjacent the bulb when the frame is in the extended position such that light shines down in the area of magnified viewing.

The frame covering wall also has a handle 19 for ease in gripping the frame for moving the frame from the retracted to the extended position.

Referring to FIG. 3, the front wall has a pair of holes 20 and 21, the hole 20 being a through hole, the hole 21 being a partial threaded hole. Between the holes, a frame portion 22 having a passage 23 is aligned such that a pivot 24, in the form of a threaded screw can pass through the hole 20, passage 23 and engage the threaded hole 21. This allows the frame 11 to be rotatable about the pivot 24, which is located on one side of the housing.

The enclosure 2 contains a battery compartment 25 housing a pair of batteries 26. A switch 27 is also included which has a lead 28 extending to a negative terminal 29 in contact with the batteries 26. A positive battery terminal 30 is connected to a lead wire 31 that has sufficient length to avoid breakage during extension and retraction. In this embodiment, the wire 31 has a coiled portion 32 that provides excess wire to avoid breakage during movement. The wire 31 terminates at a backplate 33 which contacts a terminal 34 on the light bulb 17. The bulb has a sidewall 35 in contact with a conductive receptacle 36 (best seen in FIG. 2) that is integral with a first metal plate 37 that extends to the pivot 24. In this embodiment, the conductive receptacle receives the sidewall with an interference fit, to hold the bulb in place. A second metal plate 38 surrounds the pivot so that the first metal plate rests on the second metal plate, the first metal plate on the frame being rotatable about the pivot, the second metal plate in the enclosure being stationery, such that conductive contact is maintained in all positions.

The second metal plate is engagable by a switch plate 39 movable reciprocally within the enclosures such that in a first position there is no contact and such that in a second position, (shown in phantom) the switch plate overlays the stationery second metal plate, completing a circuit. The switch provides on/off control of the light.

The front wall 6 adjacent the pivot has a second opening 40 with a flashlight lens 41 mounted therein. The lens 41 is located adjacent a bulb receiving receptacle 42. The bulb located in the frame is thus movable with the frame into the bulb receiving receptacle, such that when so received, the light bulb 17 is axially aligned with the lens, as best seen in FIG. 2. This allows the bulb to function as a flashlight using substantially the same components as those used for illuminating the magnifier. A door 43 provides access to the bulb 17, a swing latch 44 allowing the bulb to be easily replaced.

FIG. 7 shows an alternative embodiment of the invention. A combined illuminating magnifier and flashlight 45 has a similar construction to the device 1, but instead of a coiled portion, a flexible wire 46 is connected to the positive battery terminal 30 and to the back plate 33. The flexible wire 46 has a looped portion 47 that rests in a space between a wall 48 of the battery compartment 25 and the top wall 7. As the magnifier frame 11 moves, the loop shortens or lengthens in the space to avoid wire damage, as shown in phantom.

The flashlight lens is one designed to concentrate light so as to allow the light bulb to act as an effective flashlight. For example, one having a radius of about 5 mm may be used. Preferably, the non-conductive components are made of plastic though glass lenses may be used. As one example, all the non-metal parts except the magnifying lens and flashlight lens can be made of plastic, such as acrylonitrile butadiene styrene (ABS). The lenses can also be made of a transparent plastic, such as polymethyl methacrylate (ACRYLIC). In a particular embodiment of the invention, the entire frame is made of a transparent or optically opaque material such that light readily travels from the bulb into the magnifier area.

Referring to FIG. 4, the combined illuminated magnifier and flashlight 1 is shown in a front view, the lens 41 providing the flashlight function. In FIG. 5, the frame 11 is extended with a slidable button 49 available for activating the light bulb for illuminated viewing. FIG. 6 shows the combined illuminated magnifier and flashlight 1, its compact flashlight operating configuration, with the magnifying lens protected in the enclosure.

While preferred embodiments of the present invention are shown and described it will be understood by those skilled in the art that various changes or modifications could be made without varying from the scope of the present invention.

I claim:

1. A combined retractable illuminated magnifier and flashlight comprising:

a housing having a pivot;

a frame mounted on the pivot, the frame being rotatable between a retracted position where the frame is contained in the housing and an extended position where the frame is out of the housing;

a magnifying lens mounted in the frame;

a light source mounted on the frame adjacent the magnifying lens for supplying light thereto;

means for supplying power to the light source; and, a flashlight lens mounted in the housing, the light source mounted on the frame such that when the frame is in the retracted position, the light source is adjacent to the flashlight lens for supplying light therethrough.

2. The combined retractable illuminated magnifier and flashlight of claim 1 wherein the housing has a window in a bottom wall thereof and the light source illuminating an area beneath the magnifyng lens in the extended position.

3. The combined retractable illuminated magnifier and flashlight of claim 1 wherein the frame has a covering wall for fitting over an opening in the housing when the frame is in the retracted position.

4. The combined retractable illuminated magnifier and flashlight of claim 1 wherein the means for supplying power comprise battery means located within the housing, conductive means for connecting the battery means to the light source and switch means for on/off control of the light source.

5. The combined retractable illuminated magnifier and flashlight of claim 4 wherein the conductive means include at least a first metal plate on the frame and a second metal plate in the housing, each plate having portions that overlap at the pivot for maintaining conductive contact therebetween from the retracted position to the extended position.

6. The combined retractable illuminated magnifier and flashlight of claim 1 wherein the frame has a magnifying lens receiving wall, a light passage in the magnifying lens receiving wall permitting illumination of the magnifying lens by the light source.

7. The combined retractable illuminated magnifier and flashlight of claim 6 wherein the magnifying lens receiving wall is transparent.

8. The combined retractable illuminated magnifier and flashlight of claim 1 wherein the housing and frame are composed of plastic.

9. The combined retractable illuminated magnifier of claim 4 wherein the conductive means include at least one wire.

10. A method for combining a retractable illuminated magnifier and a flashlight comprising:

providing a housing having a pivot;

mounting a frame to the housing on the pivot, the frame being rotatable between a retracted position where the frame is contained in the housing and an extended position where the frame is out of the housing;

mounting a magnifying lens in the frame;

placing a light source on the frame adjacent the magnifying lens for supplying light thereto;

supplying power to the light source; and mounting a flashlight lens in the housing, the light source mounted on the frame such that when the frame is in the retracted position, the light source is adjacent to the flashlight lens for supplying light therethrough.

* * * * *